United States Patent [19]

Fager

[11] 4,328,743
[45] May 11, 1982

[54] HONEYCOMB CAPPINGS COMPRESSOR

[76] Inventor: Orville C. Fager, 1220 Grignon St., Green Bay, Wis. 54301

[21] Appl. No.: 134,141

[22] Filed: Mar. 25, 1980

[51] Int. Cl.³ .............................................. B30B 5/06
[52] U.S. Cl. ...................................... 100/49; 100/118; 100/152; 198/505; 6/12 A
[58] Field of Search ............... 100/118, 119, 120, 151, 100/152, 153, 154, 37, 48, 49; 222/58, 63; 198/505; 6/12 A

[56] References Cited

U.S. PATENT DOCUMENTS

| 404,972 | 6/1889 | Howard et al. | 100/152 |
| 1,153,103 | 9/1915 | Neale | 100/118 X |
| 1,398,790 | 11/1921 | Ogur | 222/36 |
| 2,027,542 | 1/1936 | Lissauer | 100/118 X |
| 2,490,381 | 12/1949 | Shields | 100/151 X |
| 3,821,928 | 7/1974 | Sugita | 100/118 |
| 4,236,445 | 12/1980 | Sernagiotto et al. | 100/118 |

FOREIGN PATENT DOCUMENTS 28844 6/1957 Finland ............................... 100/118

Primary Examiner—Peter Feldman

[57] ABSTRACT

A compressor for separating honey from honeycomb cappings in which two side-by-side endless conveyors converge and form a trough through which cappings are progressively compressed from inlet end to discharge end along the fixed bottom of the trough by means of said conveyors and a short length of auger mounted in the inlet end of the trough. The trough is pivoted about its midpoint to produce an imbalance which stops the compressor when empty. Honey is extruded through louvered openings impressed in the conveyors. The louvers are inwardly directed to drag the cappings along the trough during compression.

1 Claim, 5 Drawing Figures

HONEYCOMB CAPPINGS COMPRESSOR

BACKGROUND OF THE INVENTION

1. Field of the Invention

This invention relates generally to machines used in the food industry for separating a mixture of insoluble solids in a liquid. More particularly, as used in bee culture, the invention concerns means for separating honey from wax cappings.

2. Description of the Prior Art

The present state of the art appears to be well illustrated by the following U.S. Patents found in a preliminary search.

Fox, U.S. Pat. No. 2,807,034
Gregersen, U.S. Pat. No. 3,293,672
Bell, U.S. Pat. No. 3,535,721
Smith, U.S. Pat. No. 3,735,433
Cowen, U.S. Pat. No. 3,789,443

SUMMARY OF THE INVENTION

In the process of harvesting honey, an outer coating of wax is removed from the honeycombs exposing the honey contained therein. The outer coating of wax is referred to in the industry as "wax cappings". Since a considerable amount of honey sticks to the cappings, honey producers attempt to separate as much of this honey as is efficiently possible from the wax without using heat.

A current method of recovering this residual honey is to merely drain the honey from the cappings by gravity. Because of the viscous nature of honey, this method is inefficient. Another method used is to heat the cappings to accelerate the separation. However, if the temperature is not carefully controlled, the honey carmelizes and is reduced in quality.

This invention provides a machine for mechanically separating the honey and wax mixture described above without the heat. It provides a "straight through" production flow with a consequential high production rate and lower cost per unit of production. The machine can be adapted for other mixtures of edible foodstuffs where separation of the solid and liquid phases is desirable but difficult to accomplish because of the viscous nature of the material.

DESCRIPTION OF THE PREFERRED EMBODIMENT

Figure 1:
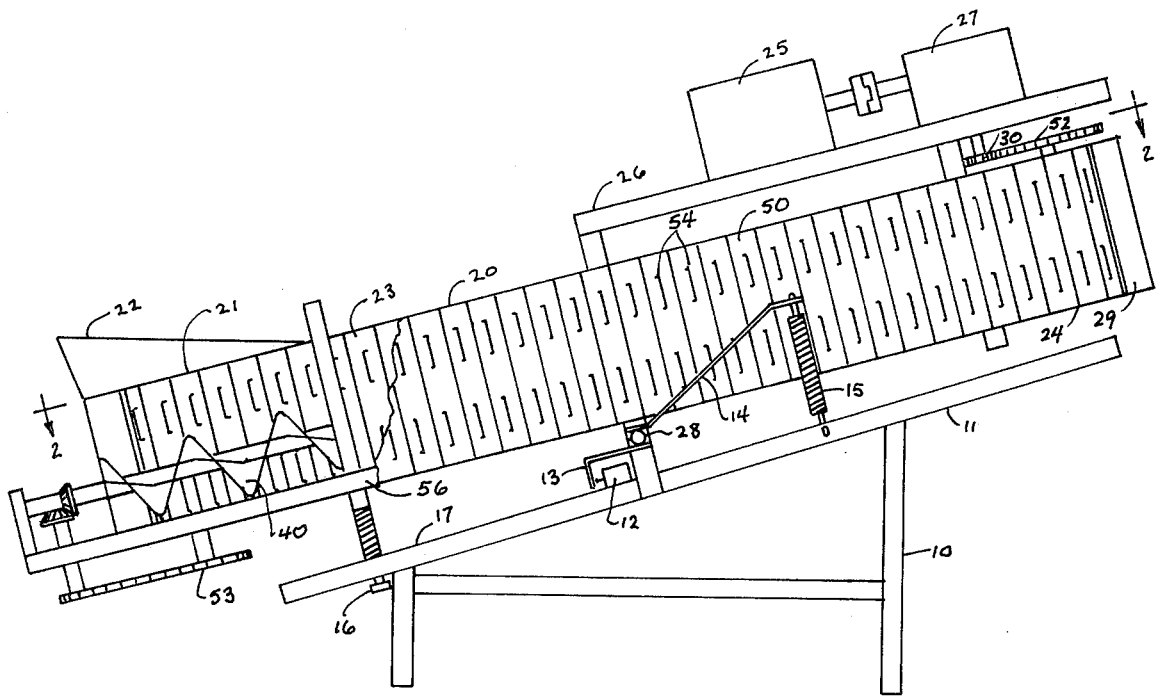
FIG. 1 is a fragmentary side elevation view of the invention.

The invention will be described by reference to the drawings.

FIG. 1

The machine is shown in a side view. The frame 10 provides a canted bed 11 on which the trough assembly 20 is mounted. The lower elevation or hopper end 21 of the trough assembly employs a chute or hopper 22 for guiding the mixture into the trough 23. Mounted inside and along the long axis of the hopper end 21 of the trough assembly 20 is short length of auger 40. The function of this auger 40 is to drive the mixture toward the discharge or higher elevation end 24 of the trough until it is "caught" by the conveyors 50 which form the side walls of the trough 23. After the mixture is "caught", the auger 40 is no longer necessary to move the mixture. Because of this limited function, an auger 40 inches long with 6 inch diameter flutes has been found to do a good job of "starting" a mixture of wax cappings when used in a 7 inch wide trough 23.

Once the mixture is "caught", it is advanced in longitudinal progression up the trough 23 by the conveyors 50. These conveyors are juxtaposed and motor 25 mounted to the trough assembly framework 26. Preferrable motor size is 1/20th of the horse power coupled to a reduction unit and transfer case with a preferrable ratio of 18:1. With wax cappings as the mixture, the preferred speeds of the auger 40 and conveyors 50 are 3.375 and 3.175 inches per minute, respectively.

To operate most efficiently, the machine should be fully loaded with mixture. As a means to insure full loading, the trough is pivoted on the framework 26 on a roller 28 at approximately the midpoint of the trough. Since a loaded trough 23 will rotate towards the hopper end 21 of the trough assembly and an empty trough 23 will rotate in the opposite direction, a microswitch 12 is mounted to the machine frame 10 and is automatically triggered by means of a lever 13 when the latter imbalance is sensed which disconnects the motor circuit and stops the machine when the machine is empty. A balancing lever 14 directly connected to the trough roller 28 and resiliently connected by a spring 15 to the frame keeps the trough 23 at a more or less even keel while operating. Thus, when the trough is empty trough motion will disconnect the motor circuits only.

Another feature of the machine is the discharge chute 29. As the trough 23 narrows at the discharge end 24, considerable pressure is put on the mixture thus increasing the separation of the liquid and solid phases. It has been found that this short length of chute can be easily modified to control the pressure the machine exerts on the entire mass of mixture within the trough.

FIG. 2

The machine is shown in a top view. This view of the machine clearly shows the juxtaposed orientation of the conveyors 50 which form the trough 23 with spaced converging runs for maintaining the imposed compression. As stated above, the trough width at the hopper end is preferrably 7 inches with cappings as the mixture. The width setting of the discharge end is a function of the material to be separated. With cappings, this dimension is preferrably 2 inches to $2\frac{1}{4}$ inches. Wider settings do not achieve maximum recovery and closer settings put too much pressure on the gear train. Finer adjustments are made by altering the length of the discharge chute 29. Best results to date have been made with a 4 inch long discharge chute 29.

The conveyors 50 are constructed from standard commercial tabletop conveyors with $7\frac{1}{2}$ inches long links. The conveyor drive gears 51 and 52 are preferrably set $4\frac{1}{2}$ feet apart to form a trough 23 of the same length. Such dimensions produce a machine which will serve most commercial apiaries.

The gear train is shown in this view also. The drive gear 30 from the transfer case 27 drives conveyor drive gear 51 shafted to the sprocket on the discharge end of one of the conveyors 50 which in turn meshes with a sister gear 52 on its opposite conveyor thus driving said conveyors. On the hopper end 21, another gear 53 is shafted to the sprocket of one of the conveyors which in turn chain drives a series of miter gears 41 shafted to the auger. Gear ratios are selected to produce auger and conveyor speeds suited to the particular mixture.

The trough framework 26 is constructed to provide bearing support for the conveyor and auger shafts, a trough bottom 56, mounting for the drive motor and transfer case and a pivotal attachment to the machine frame 10.

FIG. 3

Figure 2:
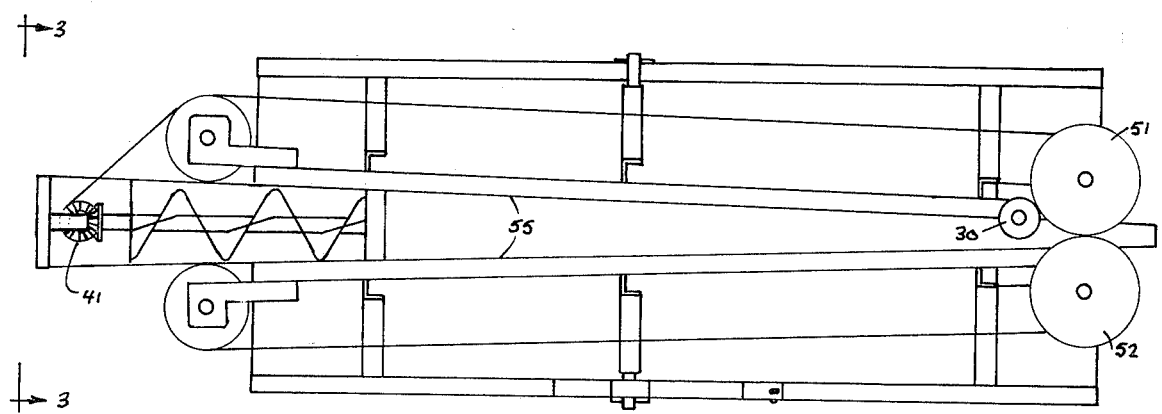
FIG. 2 is a fragmentary top view of the invention along line 2—2 of FIG. 1.
Figure 3:
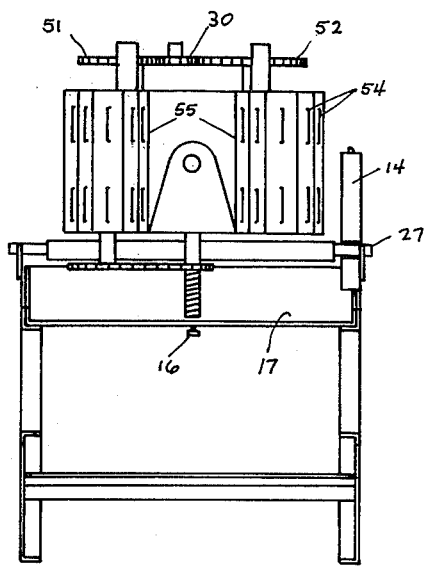
FIG. 3 is an elevational end view along line 3—3 of FIG. 2.
Figure 4:
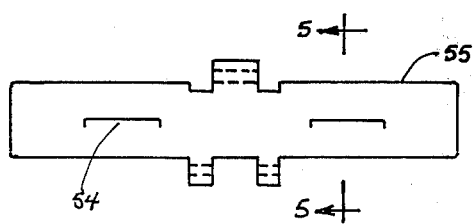
FIG. 4 is a side view of a conveyor link of the invention.
Figure 5:
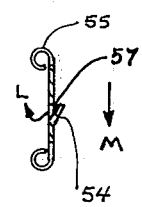
FIG. 5 is a sectional view along line 5—5 of FIG. 4.

The machine is shown in an end view. Louvered openings 54 in the converging conveyors 50 are shown as well as in FIG. 2. The mixture sides 55 of these conveyors travel from hopper to discharge ends of the trough dragging the mixture along the trough bottom while compressing it. During this constant compression, the liquid phase of the mixture is extruded through the conveyor links 55 and drain by gravity down the drip tray 17.

FIG. 4

A link 55 of the converging conveyors is shown in the figure in a side view. The preferred choice is standard commercial 7½ inches wide conveyor linkage. The only modifications to the standard links are the louvers impressed at right angles to the flow of mixture.

FIG. 5

Another view of the link 55 is shown in a sectional view. Arrows are provided to show the direction of movement of the mixture M and of the liquid phase L as it is extruded. Inwardly directed louvers 54 impressed as described are the preferred form of opening 57 since they do not clog with solids and are essentially self cleaning.

The above description gives an example of how to make and use the invention by practicing a preferred embodiment. The scope of the invention is limited in the following claims.

What is claimed is:

1. An improved honeycomb cappings compressor for separating honey from wax cappings comprising:
   a. a trough assembly comprising two side-by-side, endless vertically disposed conveyors converging towards each other for progressively compressing said cappings therebetween from an inlet end to a discharge end thereof, said trough assembly including a trough bottom disposed between said conveyor, said trough bottom being fixed with respect to said conveyors,
   b. means mounted within the inlet end of said trough assembly for driving said cappings in longitudinal progression from said inlet and toward said converging conveyors,
   c. said trough assembly being pivotally canted about a point located at approximately the mid-point thereof,
   d. automatically controlled means for stopping the operation of said compressor when empty, said stopping means comprising a switch operatively associated with said canted means and triggered by imbalance of said canted means,
   e. inwardly directed louver means impressed in each of said conveyors for dragging said cappings along said trough bottom while continuing compression, and
   f. openings formed in each of said conveyors by said inwardly directed louver means for allowing the honey to be extruded therethrough during compression.

* * * * *